(12) United States Patent
Oqab et al.

(10) Patent No.: US 11,976,573 B2
(45) Date of Patent: May 7, 2024

(54) THERMAL POWER PLANT

(71) Applicant: OQAB DIETRICH INDUCTION INC., Kitchener (CA)

(72) Inventors: Haroon B. Oqab, Kitchener (CA); George B. Dietrich, Kitchener (CA)

(73) Assignee: OQAB DIETRICH INDUCTION INC., Kitchener (CA)

( * ) Notice: Subject to any disclaimer, the term of this patent is extended or adjusted under 35 U.S.C. 154(b) by 0 days.

(21) Appl. No.: 17/633,865

(22) PCT Filed: Aug. 10, 2020

(86) PCT No.: PCT/IB2020/057524
§ 371 (c)(1),
(2) Date: Feb. 8, 2022

(87) PCT Pub. No.: WO2021/028823
PCT Pub. Date: Feb. 18, 2021

(65) Prior Publication Data
US 2022/0397042 A1    Dec. 15, 2022

Related U.S. Application Data

(60) Provisional application No. 62/884,960, filed on Aug. 9, 2019.

(51) Int. Cl.
*F01K 13/00* (2006.01)
*C10L 5/40* (2006.01)
(Continued)

(52) U.S. Cl.
CPC ............ *F01K 13/006* (2013.01); *C10L 5/40* (2013.01); *F01K 21/00* (2013.01); *F22B 3/00* (2013.01);
(Continued)

(58) Field of Classification Search
CPC ........ F01K 13/006; F01K 21/00; F01K 13/00; C10L 5/40; F22B 3/00; F23C 10/00;
(Continued)

(56) References Cited

U.S. PATENT DOCUMENTS 3,516,880 A   6/1970  Johnson
4,248,048 A   2/1981  Smith, Jr.
(Continued)

FOREIGN PATENT DOCUMENTS

DE   102007036517 A1   3/2008
DE   102009043169 A1   3/2011
(Continued)

OTHER PUBLICATIONS

JP-10115414-A translation. Date May 1998.*
(Continued)

*Primary Examiner* — Mickey H France
(74) *Attorney, Agent, or Firm* — Perry + Currier Inc.

(57) ABSTRACT

The present disclosure teaches a system and method of generating electricity via a thermal power plant. The system and method includes a fuel heating chamber configured to receive a nano-thermite fuel, an induction assembly configured to inductively heat the fuel in the fuel heating chamber, and an electricity generating subsystem configured to convert heat from the heated nano-thermite fuel into electricity.

25 Claims, 13 Drawing Sheets

(51) Int. Cl.

| | | |
|---|---|---|
| *F01K 21/00* | (2006.01) | |
| *F22B 3/00* | (2006.01) | |
| *F23C 10/00* | (2006.01) | |
| *F23C 13/00* | (2006.01) | |
| *F23C 3/00* | (2006.01) | |
| *F23C 9/06* | (2006.01) | |
| *F23C 99/00* | (2006.01) | |

(52) U.S. Cl.
CPC .............. *F23C 10/00* (2013.01); *F23C 13/00* (2013.01); *F01K 13/00* (2013.01); *F23C 3/002* (2013.01); *F23C 9/06* (2013.01); *F23C 99/001* (2013.01); *F23G 2204/204* (2013.01)

(58) Field of Classification Search
CPC .. F23C 13/00; F23C 3/002; F23C 9/06; F23C 99/001; F23G 2204/204
See application file for complete search history.

(56) References Cited

U.S. PATENT DOCUMENTS

| | | | |
|---|---|---|---|
| 5,086,720 | A | 2/1992 | Gibran |
| 6,531,704 | B2 | 3/2003 | Yadav et al. |
| 7,128,005 | B2 | 10/2006 | Carter, Jr. et al. |
| 7,253,380 | B2 | 8/2007 | Miller |
| 7,963,115 | B1 | 6/2011 | Sondergaard et al. |
| 9,120,384 | B2 | 9/2015 | Munson, Jr. |
| 2007/0056210 | A1 | 3/2007 | Schmidt |
| 2010/0247414 | A1* | 9/2010 | Krass ................. C01B 21/0685 |
| | | | 423/328.1 |
| 2011/0030859 | A1* | 2/2011 | Sawka ................... C06B 47/00 |
| | | | 149/109.6 |
| 2012/0192814 | A1 | 8/2012 | Yeh et al. |
| 2014/0260195 | A1* | 9/2014 | McAlister ................ F01N 5/02 |
| | | | 60/274 |

FOREIGN PATENT DOCUMENTS

| | | | |
|---|---|---|---|
| JP | 10054539 | A * | 2/1998 |
| JP | 10115414 | A * | 5/1998 |
| RU | 2261353 | C1 | 9/2005 |

OTHER PUBLICATIONS

JP-10054539-A translation. Date Feb. 1998.*
PCT/IB2020/057524, Thermal Power Plant, Aug. 10, 2020.
Bergthorson, Jeffrey M. "Recyclable metal fuels for clean and compact zero-carbon power." Progress in Energy and Combustion Science 68 (2018): 169-196.
Abad, Alberto, et al. "Chemical-looping combustion in a 300 W continuously operating reactor system using a manganese-based oxygen carrier." Fuel 85.9 (2006): 1174-1185.
Adanez, Juan, et al. "Chemical looping combustion in a 10 kWth prototype using a CuO/Al2O3 oxygen carrier: Effect of operating conditions on methane combustion." Industrial & engineering chemistry research 45.17 (2006): 6075-6080.
Liu, Lu., "Nano Structured Material for Energy Applications". University of Maryland, College Park, 2017.
Wang, J., et al. "A Flexible Fiber-Based Supercapacitor-Triboelectric-Nanogenerator Power System for Wearable Electronics." Advanced Materials 27.33 (2015): 4830-4836.
Poole, Gregory M. et al "Influence of Coil Configuration and Operating Conditions on Heat Transfer in Inductively Heated Risers." JOM 71.1 (2019): 40-47.

* cited by examiner

THERMAL POWER PLANT

FIELD OF INVENTION

The present disclosure relates generally to power plants. More particularly, the present disclosure relates to a method and system for generating electricity via a thermal power plant.

BACKGROUND

Access to sustainable and affordable energy is fundamental to meeting growing global energy demands. The world's overwhelming dependence on fossil fuels is driving an environmental crisis by increasing concentrations of atmospheric greenhouse gases, elevating average global temperatures and accelerating disruptive climate change. Furthermore, standards of living are directly correlated with per capita energy consumption, the human imperative to improve quality of life prompts consumption of higher levels of energy per person. These societal needs, coupled with an exponentially growing population, has led to a search for novel systems and methods of power generation that are environmentally sustainable and economically viable.

SUMMARY

The present disclosure teaches a system and method of generating electricity via a thermal power plant. The system and method includes a fuel heating chamber configured to receive a nano-thermite fuel, an induction assembly configured to inductively heat the fuel in the fuel heating chamber, and an electricity generating subsystem configured to convert heat from the heated nano-thermite fuel into electricity.

DETAILED DESCRIPTION

Thermal power plants presently burn fossil fuels, such as coal, to generate electricity. While this is easily achieved due to an abundance of fossil fuels in the past, and the relative ease in obtaining the fossil fuels, this is becoming more difficult, as fossil fuels start depleting and become harder to obtain. Fossil fuel usage also leads to higher levels of $CO_2$ in the atmosphere, contributing to global warming.

Other forms of energy production, such as nuclear energy, while able to produce energy without $CO_2$ emissions, has its own downsides, such as the danger of the radioactivity in nuclear materials and the long term storage and disposal of spent nuclear fuel.

In addition, there are several environments where the use of a thermal power plant that burns fossil fuels is not practical. An example of this is in space, or in other extreme environments.

The present disclosure provides a system and method for generating electricity via a thermal power plant, whereby a fuel comprising nano-thermites is dispersed to a selected concentration level, and heated to ignition via induction. The fuel further heats a working fluid that is then circulated to propel a turbine and generate electricity via a generator. The advantage of the present disclosure is that nano-thermites burn hotter and may burn cleaner, and hence produce less pollution. In addition, the byproduct of the combustion or sintering of nano-thermites may be collected, and recycled and/or re-used for other end products, including further energy production. Nano-thermite fuel is also generally safe to handle when contained, and is also safe to store over long periods of time with minimal change to its molecular structure. Further to this, the combination of heating through induction, and using fuel comprising nano-thermites allows for a controllable uniform temperature within a confined space, which allows for complex and exacting operations to be performed in the thermal power plant, allowing for optimal heat and power usage when heating the nano-thermite fuel. In addition, the combination of heating through induction and using fuel comprising nano-thermites further allows a thermal power plant to practically operate in extreme environments.

Figure 1:
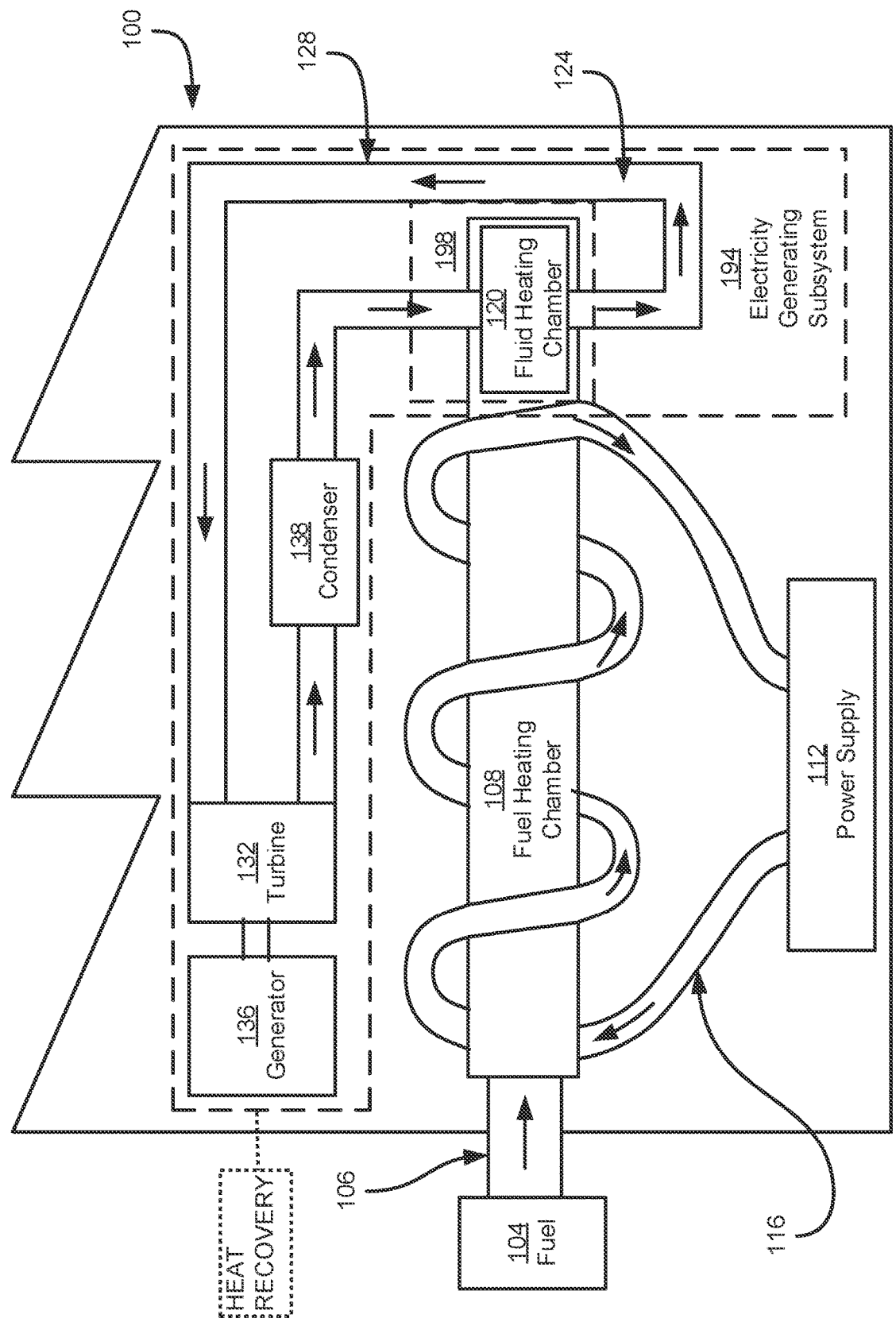
FIG. 1 shows a diagram of an example thermal power plant.

FIG. 1 depicts an example thermal power plant 100 according to the present disclosure. The thermal power plant 100 includes a fuel heating chamber 108 configured to receive fuel 104, an induction heating assembly 110 configured to heat fuel 104 in fuel heating chamber 108 via induction heating, and an electricity generating subsystem 194. In the present example, the electricity generating subsystem 194 includes a heat exchanger 198 coupled to fuel heating chamber 108 and configured to receive working fluid 124, working fluid 124 configured to be heated by heated fuel 104, and flow line 128 coupled to fluid heating chamber 120 and configured to receive heated working fluid 124 to propel at least one turbine 132 and generate electricity via at least one generator 136. In certain embodiments, such as is the one depicted in FIG. 1, heat exchanger 198 may include fluid heating chamber 120. In other embodiments, heat exchanger 198 may include exhaust heating assembly 176, which will be further discussed below and further shown in other figures. In still further examples, the electricity generating subsystem 194 may include other components and/or employ other methods to convert the heat from the heated fuel 104 into electricity, as will be described further below.

The fuel heating chamber 108 is configured to receive fuel 104. In the current example, fuel heating chamber 108 may be generally cylindrical in shape to allow for coil 116 of induction heating assembly 110 to be wrapped around fuel heating chamber 108. Other shapes of vessels may be contemplated for fuel heating chamber 108. In addition, in other embodiments, there may be two sets of coils wrapped around each other, allowing the creation of a range of magnetic fields with varying magnitudes. Additionally, in other embodiments, one or more coils may be set up adjacent to fuel heating chamber 108. Other configurations of generating a magnetic field may be contemplated. In operation, fuel 104 is received and housed inside fuel heating chamber 108 while induction heating assembly 110 heats fuel 104.

In some examples, fuel 104 may be supplied to fuel heating chamber 108 via feeding assembly 106. For example, feeding assembly 106 may include a fuel pump, an intake opening on fuel heating chamber 108, a conveyor belt or the like configured to supply fuel 104 to fuel heating chamber 108 from a fuel source. The fuel source may be another chamber, storage or holding area housing fuel 104 until it is to be received by fuel heating chamber 108. In some examples, feeding assembly 106 may further include intermediate manipulators configured to prepare fuel 104 for supply to fuel heating chamber 108. In other examples, feeding assembly 106 may further disperse fuel 104 into fuel heating chamber 108, or more specifically if fuel 104 was aerosolized, feeding assembly 106 may spray aerosolized fuel 104 into fuel heating chamber 108. An example of an intermediate manipulator is a mixing chamber, for receipt of multiple different types of fuel 104 to be combined.

Figure 2:
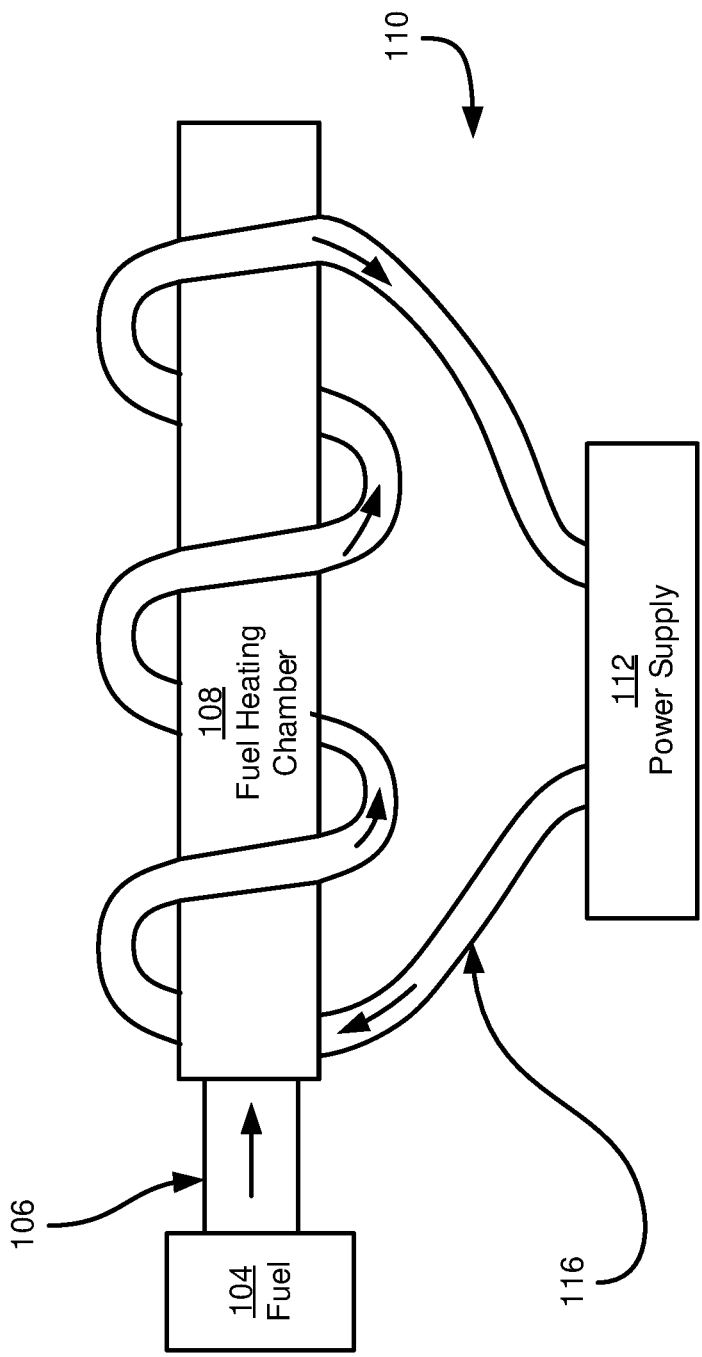
FIG. 2 shows a diagram of an example induction heating assembly.

Referring to FIG. 2, induction heating assembly 110 includes an electromagnet and an electronic oscillator. Induction heating assembly 110 heats fuel 104 using induction heating, for example by inducing eddy currents and hysteresis in the thermites in the fuel 104 to ignite and heat it. In the current example, coil 116 and fuel 104 form an electromagnet. Power supply 112 is the electronic oscillator. Coil 116 is wrapped around fuel heating chamber 108, therefore coil 116 forms a solenoid shape with fuel heating chamber 108 in its center. Coil 116 is coupled to power supply 112, which is configured to pass a current through coil 116 for generating a magnetic field. The oscillations in of the magnetic field may be timed to provide for an alternating field Halbach array.

In operation, fuel heating chamber 108 receives fuel 104. The power supply 112 passes a current through coil 116, as indicated in FIG. 1 by arrows. In accordance with Ampere's Law, the current flowing through coil 116 induces a magnetic field around coil 116. Further, based on the solenoid shape of coil 116 being wrapped around fuel heating chamber 108, the magnetic fields of each turn of coil 116 pass through the center of the coil, thereby producing a strong alternating magnetic field at the center of coil 116 (e.g. within fuel heating chamber 108).

In some examples, power supply 112 is configured to vary the current passing through coil 116, thereby varying the magnetic field. In other examples, coil 116 may be configured to move relative to fuel heating chamber 108 to vary the frequency and strength of the magnetic field. In accordance with Faraday's Law of Induction, the varying magnetic field induces eddy currents and hysteresis in nearby conductors, and in the current example, fuel 104 thus heating the nano-thermites in the fuel 104.

In some examples, fuel 104 may be heated via magnetic hysteresis of particles. In particular, hysteresis loss is caused by the magnetization and demagnetization of fuel 104 to produce heat. When magnetic force is applied, the molecules of fuel 104 are aligned in a first direction. When the magnetic force is reversed, fuel 104 opposes the reversal of magnetism, resulting in hysteresis loss, and hence heating fuel 104 and also to the point of ignition.

In some examples, induction heating assembly 110 may employ a combination of magnetic hysteresis and induction heating via eddy currents to heat the fuel 104.

In the current example, fuel 104 is a reactive metal compound such as a nano-thermite. In particular, the nano-thermite fuel includes an oxidizer and a reducing agent (e.g. a metal and a metal oxide). Nano-thermite fuel may also include an inert gas allowing the nano-thermite fuel to be aerosolized. Aerosolized nano-thermite fuel allows for greater dispersion in fuel heating chamber 108 for uniform temperature control. Eddy currents are induced by coil 116 and power supply 112 within the nano-thermite fuel, the resistance of the eddy currents flowing through the nano-thermite heating it through Joule heating.

Nano-thermite fuel may be advantageous for use in a thermal power plant 100 that heats the nano-thermite fuel to ignition through induction, as the energy release per mass of particle is larger than the ignition of other fuels, such as hydrocarbons, gas, petroleum, coal, and ethanol. The nano-thermite fuel may contain nano-thermites, which are on the scale of 100 nanometers or below. The nano-thermite fuel may also contain an oxidizer. Nano-thermite fuel in an aerosolized form allows the dispersion of the nano-thermite fuel within fuel heating chamber 108. The dispersion of nano-thermite fuel in fuel heating chamber 108, along with coil 116 wrapped around fuel heating chamber 108, allows for a substantially uniform temperature control of the entire volume of fuel heating chamber 108. This allows for the controlling of an optimal temperature for the combustion or sintering, or other forms of heating of the nano-thermite fuel. The combustion, sintering and other forms of heating fuel 104 will be discussed further below.

In other examples, fuel 104 may include more than one material. For example, fuel 104 may include, but is not limited to, magnetic materials, electrically conductive materials, nanoenergetic composites, nanowires or nanorods (e.g. including nickel, gold and/or silver), solids, liquids, gases, graphene, reactive metal compounds, synthetic and non-synthetic polymers, hydrogels, thermo plastics, metamaterials and other nano-thermites, and in situ space resources, including a plurality of fuel sources found on celestial bodies, the Moon, Mars, other planets, asteroids, planetoids, and other celestial bodies. In an example where in situ space resources are used, this allows for the long-term operation of thermal power plant 100 in space. Other examples include using available materials in extreme environments for long-term operations. Extreme environments are those in which it is difficult for life forms to survive. Examples of extreme environments include an environment that has high or low temperatures, has high pressure, or has low oxygen, such as at high altitudes, or deep depths under oceans. More generally, fuel 104 may include multiple materials having different configurations, including, but not limited to, particle size, packing structure (e.g. simple cubic packing, face-centered cubic packing, hexagonal packing), different reaction temperatures, or otherwise different heating profiles. For example, the multiple materials may be combined in fuel 104 as different layers forming a shell, as a heterogenous or homogenous mixture or the like. Heating fuel 104 with different layers may produce different heating profiles.

In the current example, fuel 104 is inductively heated to combustion. If fuel 104 is heated to combustion, thermal power plant 100 may include an ignition system in fuel heating chamber 108. The ignition system may be used to ignite fuel 104 to combustion. Further, in the current example, fuel 104 may be a nano-thermite fuel, which when combusted would lead to lower pollution when compared to the combustion of other fossil fuels.

In other examples, fuel 104 is subjected to sintering (e.g. heating without liquefaction). In other examples, where fuel 104 is composed of multiple materials, a mix of combustion and sintering may be achieved. Additionally, in other examples, the fuel 104 may be heated to other reaction points, based on the desired manner of producing electricity with the heated fuel. For example, the fuel 104 may be melted, heated to a certain, specific temperature without changing states, or the like.

Fuel 104 may be heated in a controlled fashion, according to a desired heating profile. For example, fuel 104 may be subjected to sintering first for a period of time, and then subjected to combustion afterwards. In another example, fuel 104 may be subjected to combustion first, and then the fuel products after combustion and any remaining fuel 104 may be subjected to sintering. Fuel 104 may be subjected to any combination of sintering and combustion cycles, in addition to other combinations of sintering, combustion and other heating methods.

The advantage of sintering is to gather peak efficiency of heating fuel 104 and to output a controlled heat while depleting fuel 104 at a measurable rate. The advantage of combustion of fuel 104 is the use of less energy to heat fuel 104, and the ability to recycle the combustion byproducts, as will be described further below.

Returning to FIG. 1, fluid heating chamber 120 is coupled to fuel heating chamber 108 and is configured to receive working fluid 124. Fluid heating chamber 120 is coupled to fuel heating chamber 108 with an impermeable wall between them. The impermeable wall allows both fuel chamber 108 and fluid heating chamber 120 to be in conductive contact with each other, and physically isolates each chamber's contents from one another. This allows for a heat exchange between the two chambers through the impermeable wall and prevents contamination between fuel 104 and working fluid 124. Fluid heating chamber 120, fuel heating chamber 108 and the impermeable wall form a heat exchange system. For example, the fluid heating chamber 120 and the fuel heating chamber 108 may each be formed of a conductive material and be placed in physical contact with each other to allow heat to be transferred from the fuel heating chamber to the fluid heating chamber. In such an example, the walls or portions of walls of the fuel heating chamber 108 and the fluid heating chamber 120 form the impermeable wall. Fluid heating chamber 120 is connected to flow line 128 to receive working fluid 124, and for working fluid 124 to exit fluid heating chamber 120. For example, fluid heating chamber 120 may be integrally formed with the flow line 128, and may be defined as a portion of flow line 128 in conductive contact with fuel heating chamber 108 to allow the working fluid 124 to be heated in said portion of the flow line 128. In other examples, the fluid heating chamber 120 may be a separate chamber (e.g., having a defined space, including having one or more valves, inlets/outlets, or the like) in-line with the flow line 128. Examples of working fluid 124 include, but is not limited to, water, carbon dioxide, hydrogen, methane, biofuels, or the like.

In other examples, the heat exchanger 198 may allow the heated fuel 104 and the working fluid 124 to physically mix. For example, the heat exchanger 198 may include a chamber to intake the heated fuel 104 and allow it to physically mix with the working fluid 124 to heat the working fluid 124, and a separation means to release the heated working fluid 124 to the flow line 128. For example, the heated fuel 104 may be aerosolized and sprayed into the chamber to heat the working fluid 124. In other examples, the chamber may include a mixer, such as a rotating paddle, fan(s) or other means to mix the heated fuel 104 and thereby heat the working fluid 124.

Working fluid 124 is heated via heat exchange from heated fuel 104. Heat is transferred through conduction from fuel 104 to fluid heating chamber 120, containing working fluid 124. In the current example, the combustion of a continuous supply of fuel 104 heats working fluid 124 as it flows through fluid heating chamber 120. In other examples, where sintering of fuel 104 occurs, the heat generated from the sintering allows for working fluid 124 to be heated as it flows through fluid heating chamber 120. As working fluid 124 is heated, it may undergo a phase change, and then exits the fluid heating chamber 120 into flow line 128. In the current example, working fluid 124 is water, and it is evaporated into steam as it travels through fluid heating chamber 120. The steam then exits fluid heating chamber 120 into flow line 128.

Flow line 128 receives working fluid 124 and directs the flow of working fluid 124 to turbine 132. In the current example, working fluid 124 flows in the direction of the arrows depicted in flow line 128 on FIG. 1. Flow line 128 further transports working fluid 124 from turbine 132 to condenser 138, and returning working fluid 124 to fluid heating chamber 120, creating a circulation of working fluid 124.

Turbine 132 is connected to flow line 128 containing heated working fluid 124 to receive heated working fluid 124. Turbine 132 is also connected to generator 136 via a shaft. Heated working fluid 124 propels turbine 132, which in turn drives generator 136. Continuing with the current example where heated working fluid 124 is steam, the steam flows from flow line 128 into turbine 132, where it propels turbine 132. The generator 136 generates an electric current, which is then sent out of thermal power plant 100 to be used as electricity.

In alternate embodiments, working fluid 124 as steam may drive a steam engine, such as a sterling engine, in order to generate power and/or provide locomotion. Other uses of steam to power different mechanical engines to generate power may be contemplated.

Condenser 138 is configured to receive working fluid 124 after working fluid 124 has circulated through turbine 132 and condenses working fluid 124, before returning condensed working fluid 124 to fluid heating chamber 120. Condenser 138 may be an active condenser or a passive condenser. Active condensers include either jet condensers or surface condensers. Condenser 138 may also be a combination of active and passive condensers, or a combination of two types of active condensers. For example, condenser 138 may be a combination of a jet condenser, followed by a surface condenser. In other examples, such as when a working fluid other than water is used, the condenser 138 may more generally cool or otherwise revert the heating working fluid to its original state to be recirculated.

Figure 13:
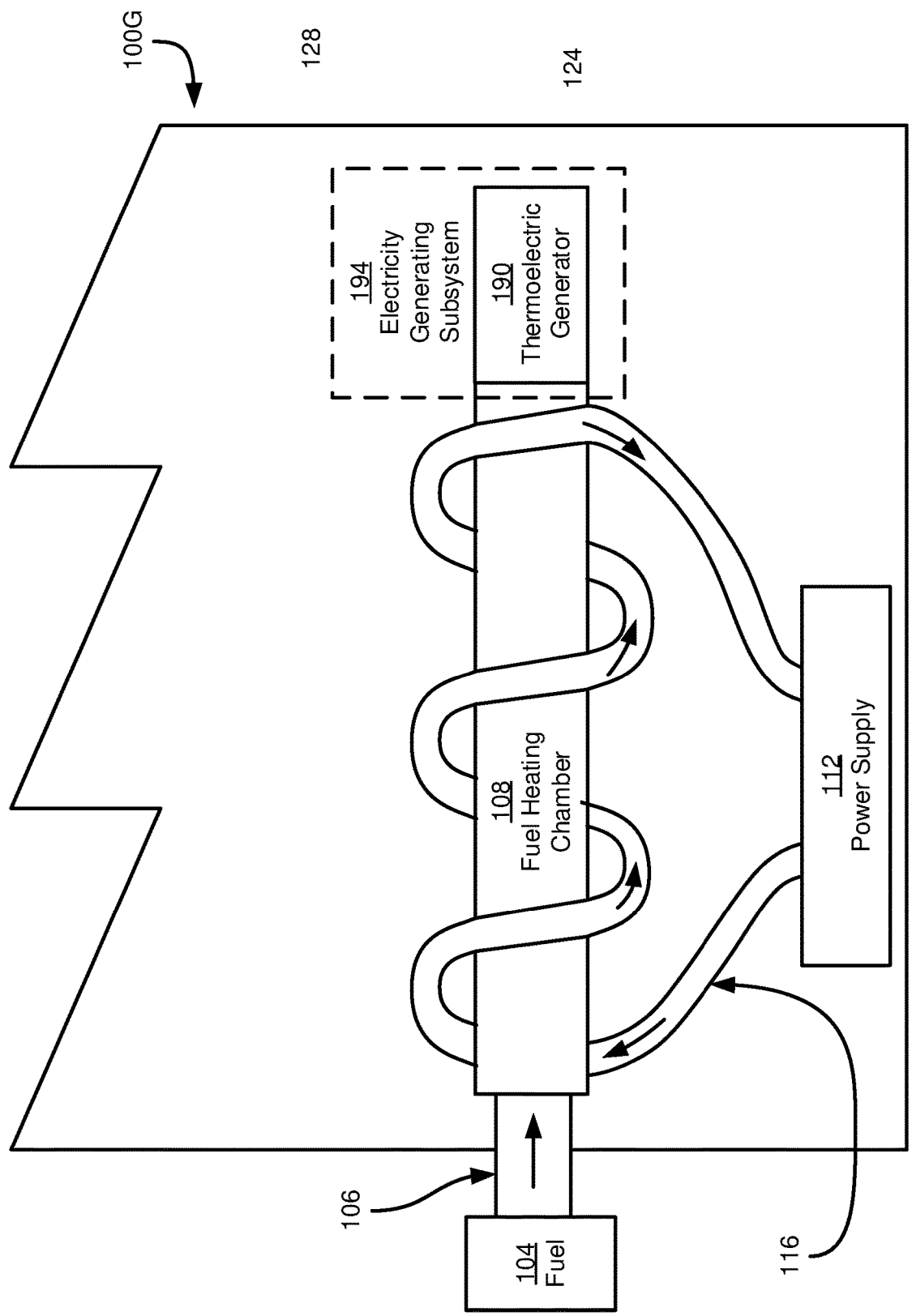
FIG. 13 shows a diagram of another example thermal power plant including a thermoelectric generator.

In an alternative example depicted in FIG. 13, thermal power plant 100G includes a thermoelectric generator 190. In previously described embodiments, electricity generating subsystem 194 may have included heat exchanger 198, condenser 138, flow line 128, turbine 132 and generator 136. In this example thermal power plant 100G, electricity generating subsystem 194 is comprised of thermoelectric generator 190. Thermoelectric generator 190 may be used in replacement of generator 136 without the need for fluid heating chamber 120, working fluid 124, flow line 128, turbine 132, and condenser 138. The thermoelectric generator converts heat into electricity by using thermoelectric effects, such as the Seebeck effect, Peltier effect, and Thompson effect. The Seebeck effect produces an electric current when dissimilar metals are exposed to a variance in temperature allowing the thermoelectric generator to convert heat into energy where the voltage produced is proportional to the temperature distance between the two dissimilar metals. The thermoelectric generator would generate electricity from the heat generated from combustion and/or sintering of fuel 104 in fuel heating chamber 108. The Peltier effect is the production or absorption of heat at a junction between two different conductors when electric charge flows through it. The Thomson effect is the production or absorption of heat along a conductor with a temperature gradient when electric charge flows through it.

Figure 3:
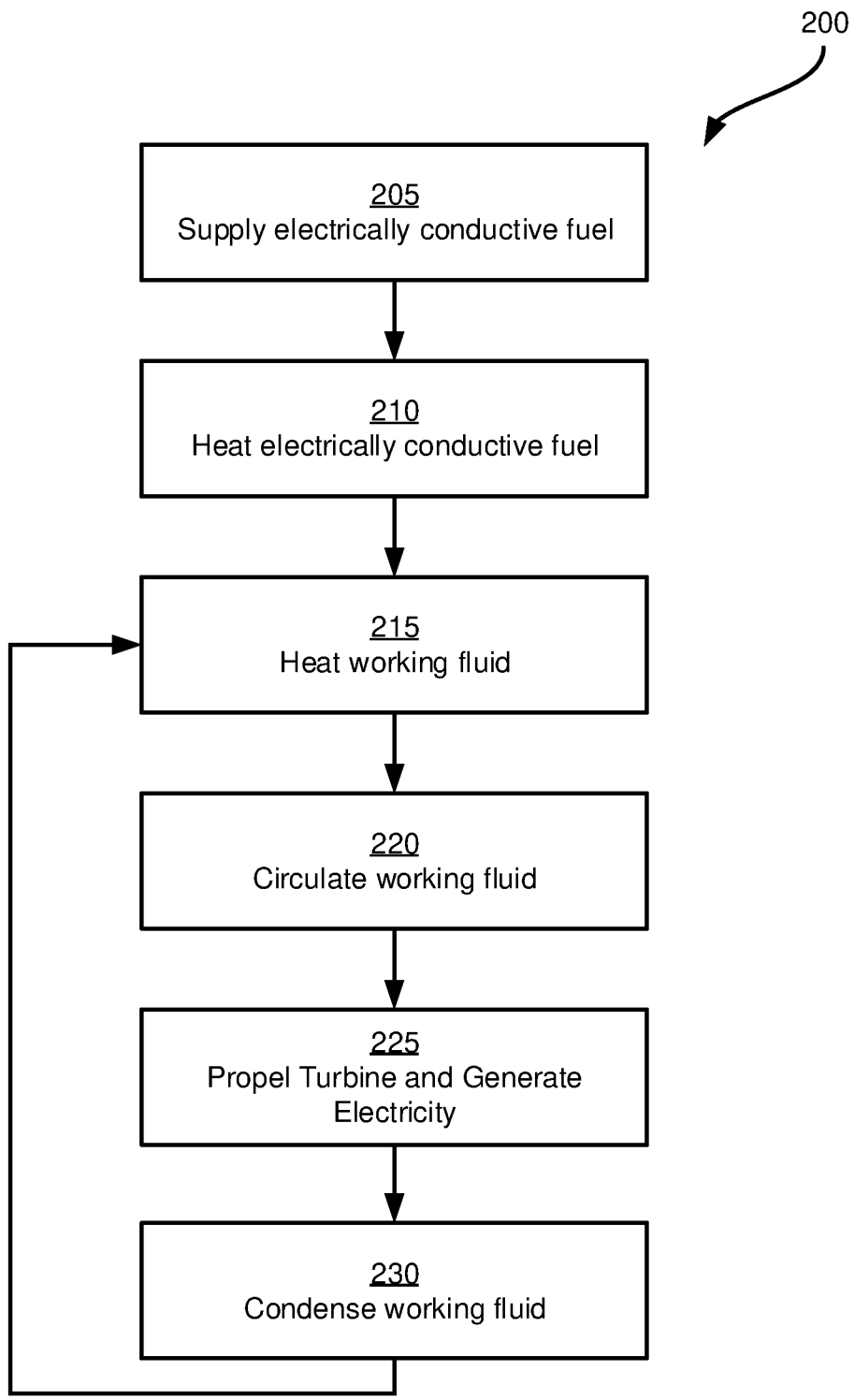
FIG. 3 is a flowchart of a method for generating electricity via the thermal power plant of FIG. 1.

Referring now to FIG. 3, a method 200 of generating electricity is depicted. Method 200 will be described in conjunction with its performance in thermal power plant 100. In other examples, method 200 may be performed by other suitable systems. At block 205, fuel 104 is supplied to and placed into fuel heating chamber 108, for example, via feeding assembly 106. At block 210, fuel 104 is heated via induction inside fuel heating chamber 108 using induction heating assembly 110. In particular, an alternating magnetic field is passed through surrounding coil 116, using power supply 112, and applied to fuel 104 to induce eddy currents and/or hysteresis, resulting in the heating of fuel 104 due to combustion and/or sintering.

At block 215, working fluid 124 is heated in fluid heating chamber 120 via heat exchange from fuel 104. For example, inductively heating fuel 104 leads to the combustion of fuel 104. In the current example, the combustion of fuel 104 heats working fluid 124.

At block 220 and block 225, heated working fluid 124 is circulated via flow line 128 to turbine 132, where working fluid 124 propels turbine 132. Propelling turbine 132 turns a shaft connected to generator 136, where electricity may be generated.

At block 230, working fluid 124 is collected in condenser 138, where working fluid 124 is condensed, and then returned via flow line 128 to fluid heating chamber 120, where working fluid 124 may be heated up again and re-circulated in a loop.

Figure 4:
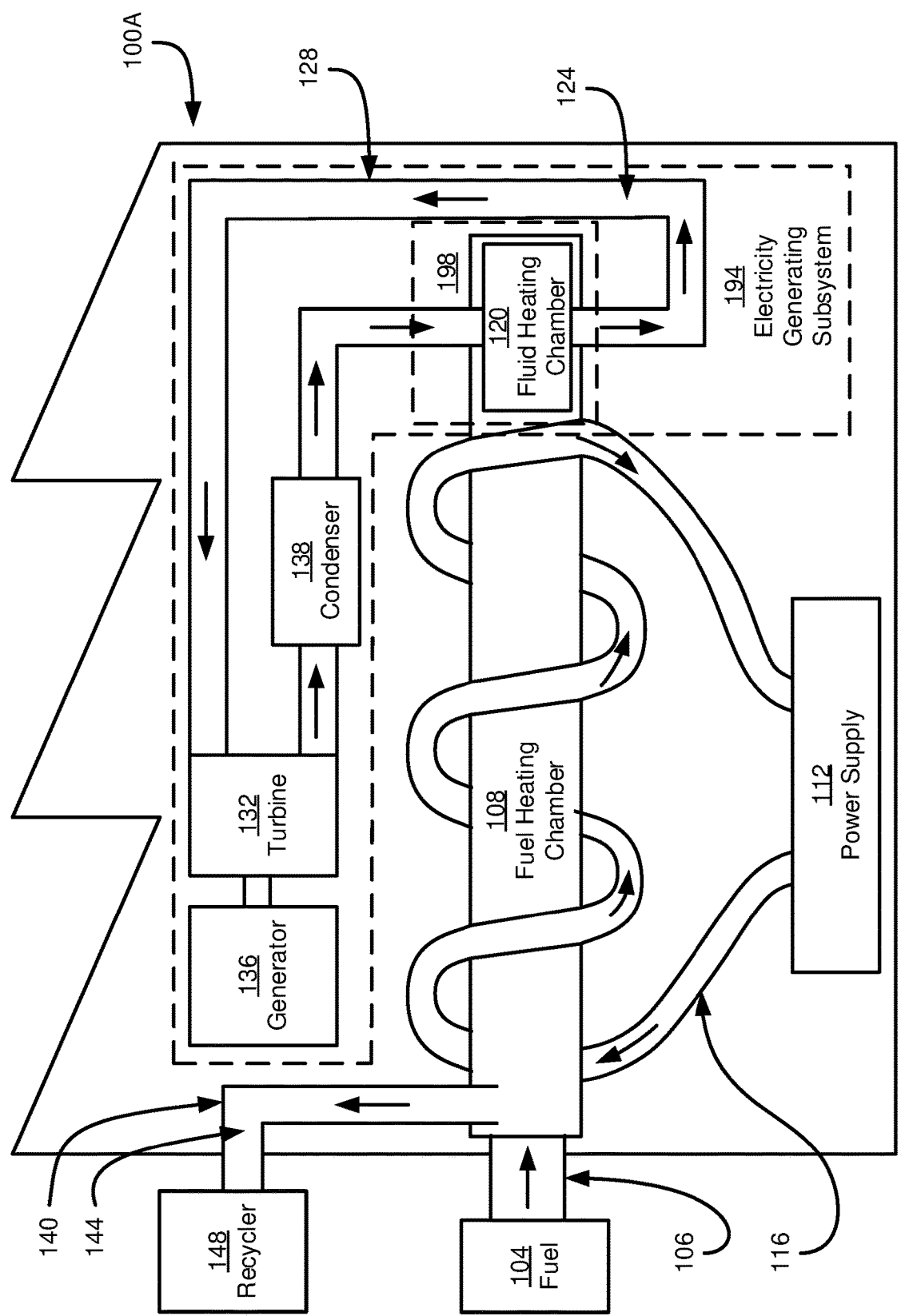
FIG. 4 shows a diagram of another example thermal power plant that includes a recycler.

FIG. 4, depicts another example thermal power plant 100A. In this example, collection line 140 is connected to fuel heating chamber 108 to collect and transport one or more of the combustion byproducts 144. Recycler 148 is configured to receive one or more of the combustion byproducts 144. The combustion of fuel 104 may lead to one or more combustion byproducts 144 that may be chemically recycled into a new product by altering the chemical composition. Recycler 148 is configured to process and chemically alter combustion byproduct 144 into a new end product to be used for other means. Recycler 148 may receive additional raw materials to be mixed with combustion byproduct 144 for the chemical alternation. For example, with the combustion of nano-thermite as the fuel 104, heat and combustion byproduct 144 is created. The heat is used to heat working fluid, while combustion byproduct 144 is collected by the collection line 140 and sent to recycler 148. Combustion byproduct 144 may undergo reduction processes, such as electrolysis, to produce end products to be recycled and/or re-used.

The thermal power plant 100A may additionally include a separating means to separate the combustion byproduct. The separating means may be integrated with the fuel heating chamber 108, the recycler 148, or may be a distinct component. The separating means may include physical means of separating the combustion byproduct 144 from the fuel 104 or from other waste products in the fuel heating chamber 108, such as a sieve, a separating chamber (e.g., to allow the products to separate naturally by density), or other means of separating the combustion byproduct 144 (e.g., magnetically, ionically, or based on other properties of the combustion byproduct 144).

An example of fuel 104 that is a nano-thermite fuel may be aluminum-iron (II) Oxide. When combusted, aluminum-iron (II) oxide becomes aluminum oxide, elemental iron and a large amount of heat. The heat is used to heat working fluid 124. Combustion byproduct 144 is aluminum oxide and iron. The aluminum oxide may be used on its own for other products, or it may be chemically converted into other materials to be used for other products.

Figure 5:
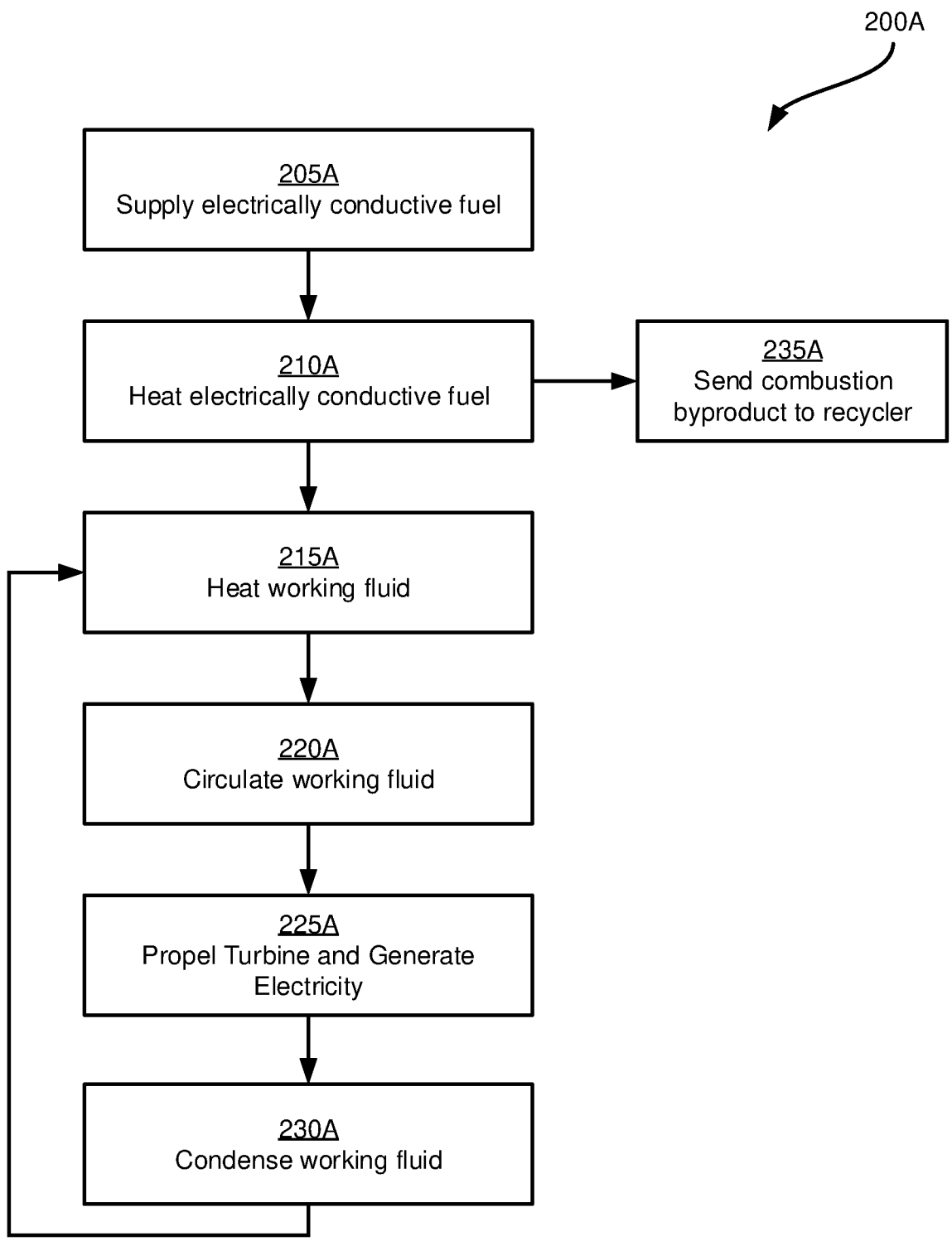
FIG. 5 is a flowchart of a method for generating electricity via the thermal power plant of FIG. 4.

FIG. 5 depicts method 200A to generate electricity using example thermal power plant 100A. Blocks 205A, 210A, 215A, 220A, 225A and 230A are similar to blocks 205, 210, 215, 220, 225 and 230 respectively in method 200. At block 235A, combustion byproduct 144 is collected by collection line 140, and is sent to recycler 148. Recycler 148 takes combustion byproduct 144 and chemically alters it into a recycled product that may be used elsewhere (e.g. other industries, or for other goods).

Figure 6:
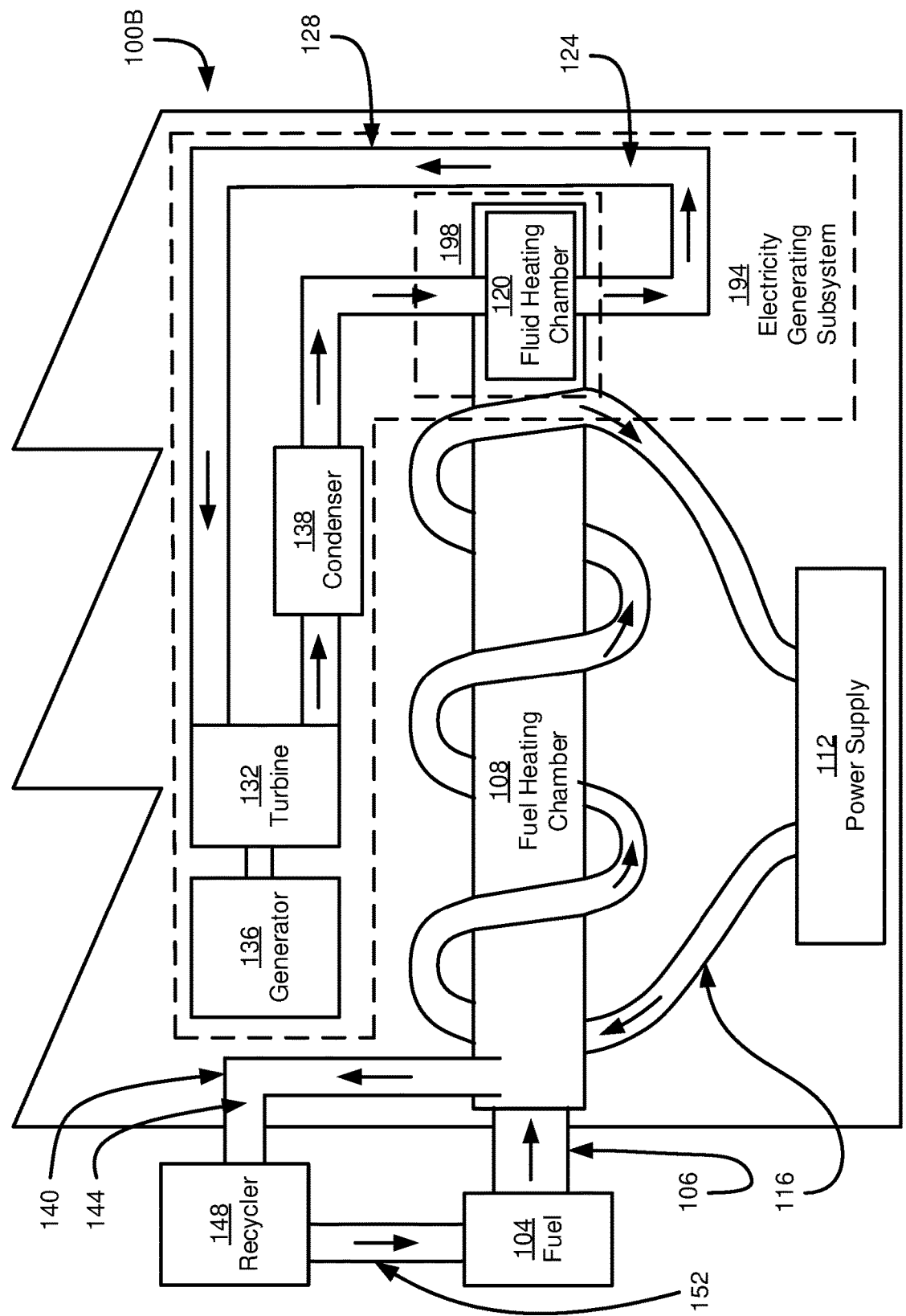
FIG. 6 shows a diagram of another example thermal power plant that includes a recycler with the ability generate additional fuel to be sent back into the thermal power plant.

FIG. 6, depicts another example thermal power plant 100B that expands upon thermal power plant 100A. In this example, recycler 148 may chemically alter combustion byproduct 144 into another chemical compound to be used as fuel 104. Alternatively, recycler 148 may chemically alter combustion byproduct 144 into an alternate nano-thermite to be used as fuel 104. It may also be contemplated that recycler 148 may chemically alter combustion byproduct 144 and return the chemical composition of combustion byproduct 144 into fuel 104. Thermal power plant 100B further includes a return line 152 configured to send the chemically altered combustion byproduct 144 back as fuel 104 to feeding assembly 106 to be reintroduced into fuel heating chamber 108.

Figure 7:
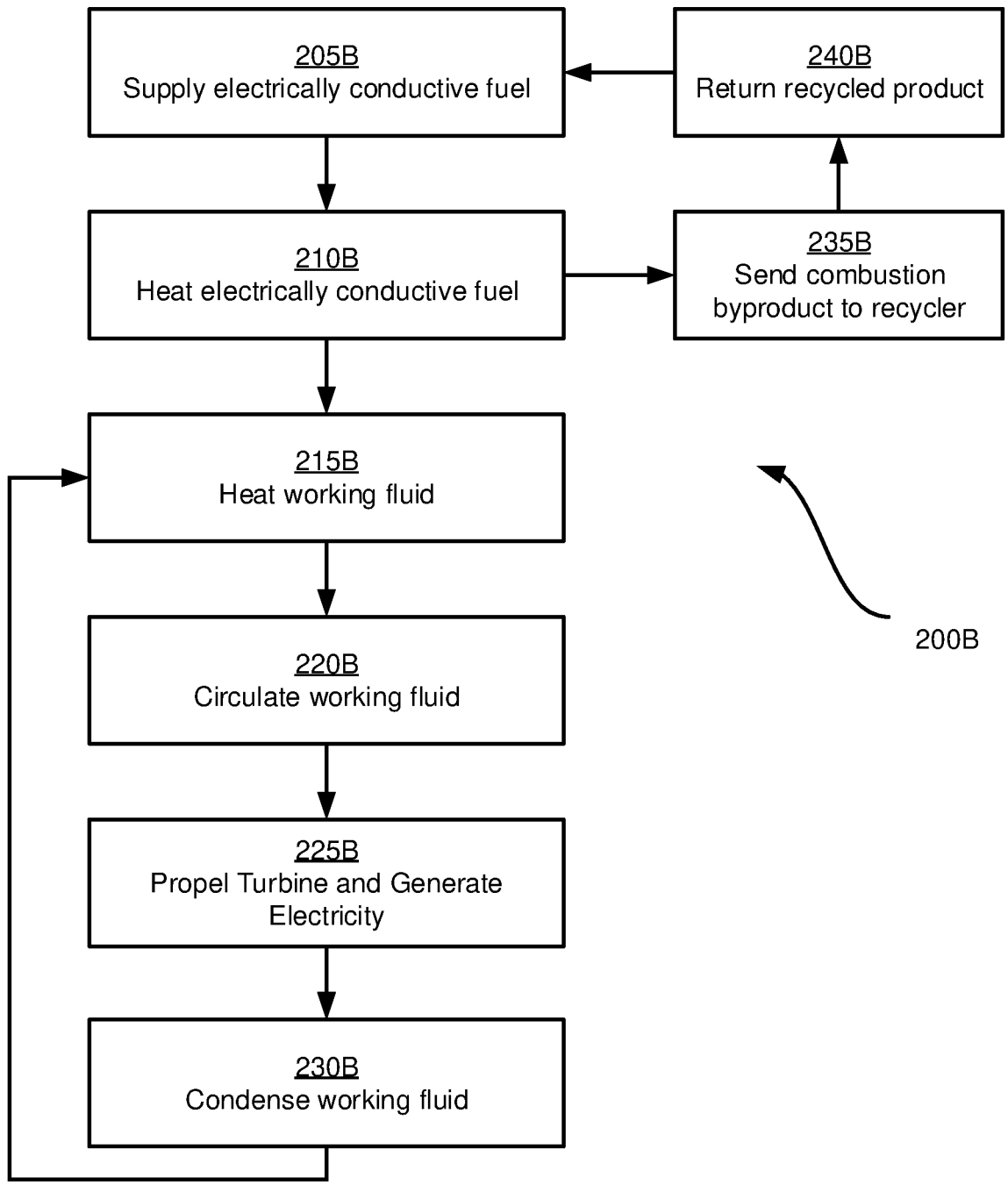
FIG. 7 is a flowchart of a method for generating electricity via the thermal power plant of FIG. 6.

FIG. 7 depicts method 200B to generate electricity using example thermal power plant 100B. Blocks 205B, 210B, 215B, 220B, 225B, 230B, 235B are similar to blocks 205A, 210A, 215A, 220A, 225A, 230A and 235A respectively in method 200. At block 240B, recycler 148 converts combustion byproduct 144 from fuel heating chamber 108. In particular, recycler 148 takes combustion byproduct 144, and chemically alters combustion byproduct 144 into fuel 104, which may then be reintroduced into fuel heating chamber 108. In this particular example, fuel 104 that is initially introduced to fuel heating chamber 108 may be the same, or may be chemically different from the recycled product fuel 104 that is reintroduced. If the two compounds are different, this may lead to a combined fuel 104.

For example, returning to the above example where combustion byproduct 144 is aluminum oxide and iron. A chemical reaction can be performed to return the aluminum oxide and iron into aluminum-iron (II) oxide. The aluminum-iron (II) oxide can then be returned to be used as fuel 104.

Figure 8:
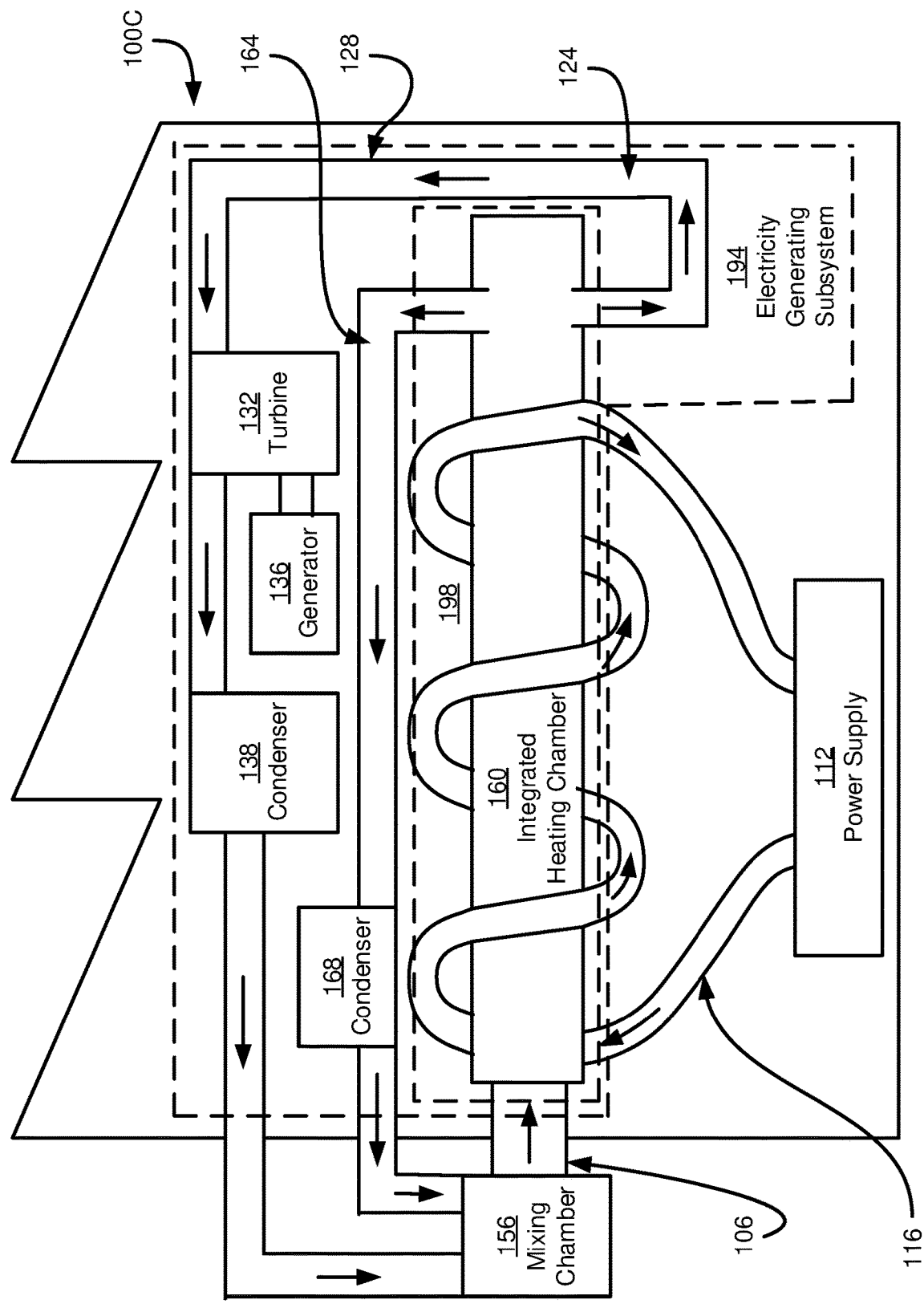
FIG. 8 shows a diagram of another example thermal power plant that includes a mixing chamber.

FIG. 8 depicts another example thermal power plant 100C that includes a different configuration. Thermal power plant 100C includes integrated heating chamber 160. In this example, heat exchanger 198 includes integrated heating chamber 160. Integrated heating chamber 160 may be an integration of fuel heating chamber 108 and fluid heating chamber 120, that allows for a mixture of both working fluid 124 and fuel 104 to be inductively heated. In this example, mixing chamber 156 mixes fuel 104 and working fluid 124 to produce a slurry. The slurry is inductively heated in integrated heating chamber 160, and then then fuel 104 and working fluid 124 are separated. Separation may occur through a change of state as temperature changes in integrated heating chamber 160. Alternatively, a mechanical device, such as a sieve may be used to separate working fluid 124 from fuel 104. In addition, separation may occur through a separation chamber where pressure is altered. Other forms of separation are contemplated. Fuel 104 returns to mixing chamber 156 to be mixed again, while working fluid 124 is sent through turbine 132 to generate electricity.

Figure 9:
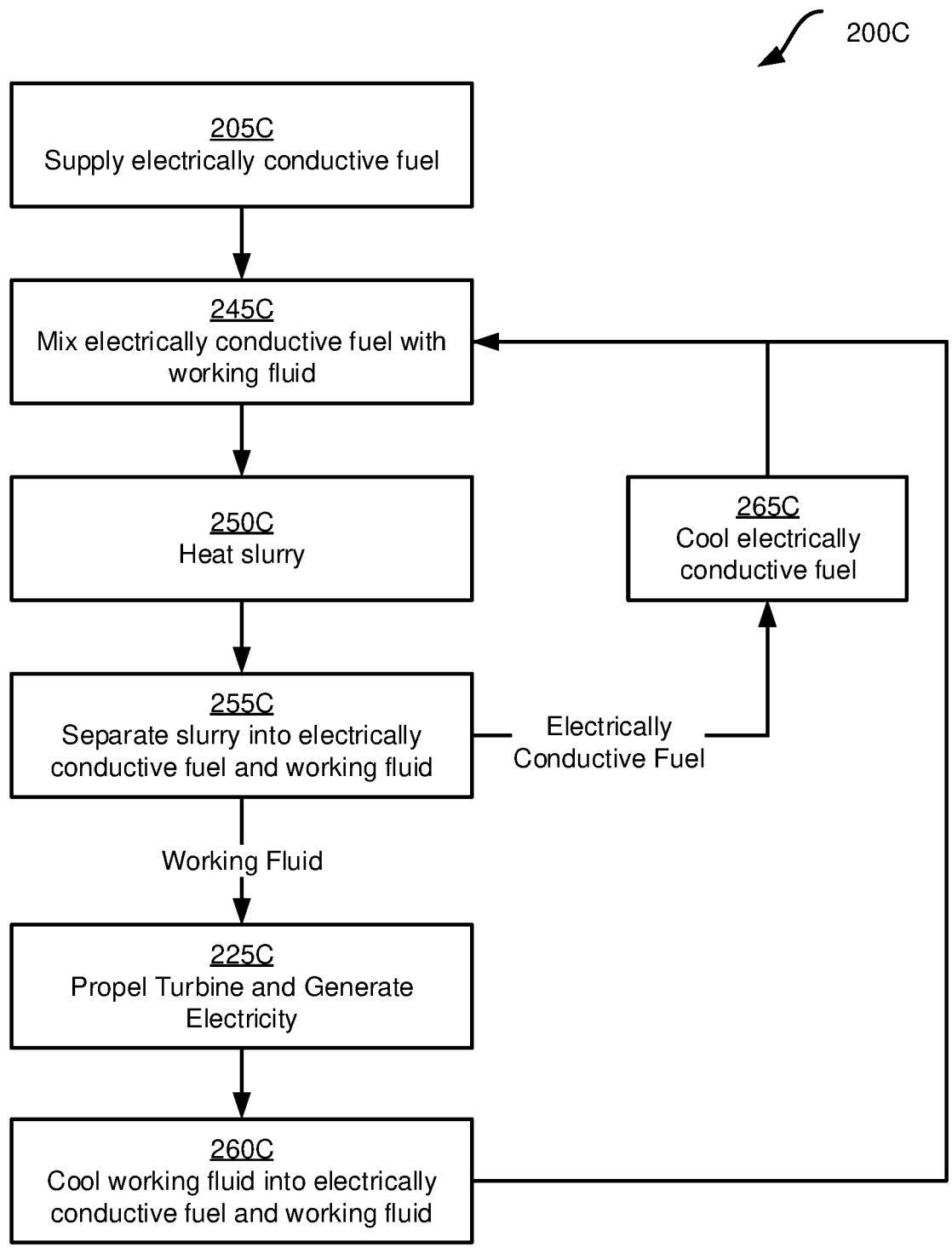
FIG. 9 is a flowchart of a method for generating electricity via the thermal power plant of FIG. 8.

FIG. 9 depicts method 200C of electricity generation for this example thermal power plant 100C. At block 205C, fuel 104 is supplied to mixing chamber 156. At block 245C, fuel 104 is mixed with working fluid 124 to produce a slurry.

An example of a slurry may be a mixture of water as working fluid 124, and aluminum-iron (II) oxide as nano-thermite fuel 104. Other forms of the slurry where working fluid 124 and fuel 104 are mixed are contemplated.

The slurry is then delivered into integrated heating chamber 160. At block 250C, the slurry is heated through induction, after which at block 255C, the slurry is then separated back into working fluid 124 and fuel 104. Flow line 164 collects fuel 104 and sends fuel 104 to condenser 168 to be condensed. This is depicted at block 265C. After being condensed, the condensed fuel is returned to the mixing chamber 156 to be mixed again with working fluid 124 and re-introduced into integrated heating chamber 160 as a slurry.

Continuing with this example, at block 225C, working fluid 124 is collected by flow line 128, where is sent to propel turbine 132. At block 260C, working fluid 124 is cooled and condensed in condenser 138. After circulating through turbine 132 and condenser 138, working fluid 124 is returned to mixing chamber 156 to be mixed again with fuel 104 and re-introduced into integrated heating chamber 160 as a slurry.

Figure 10:
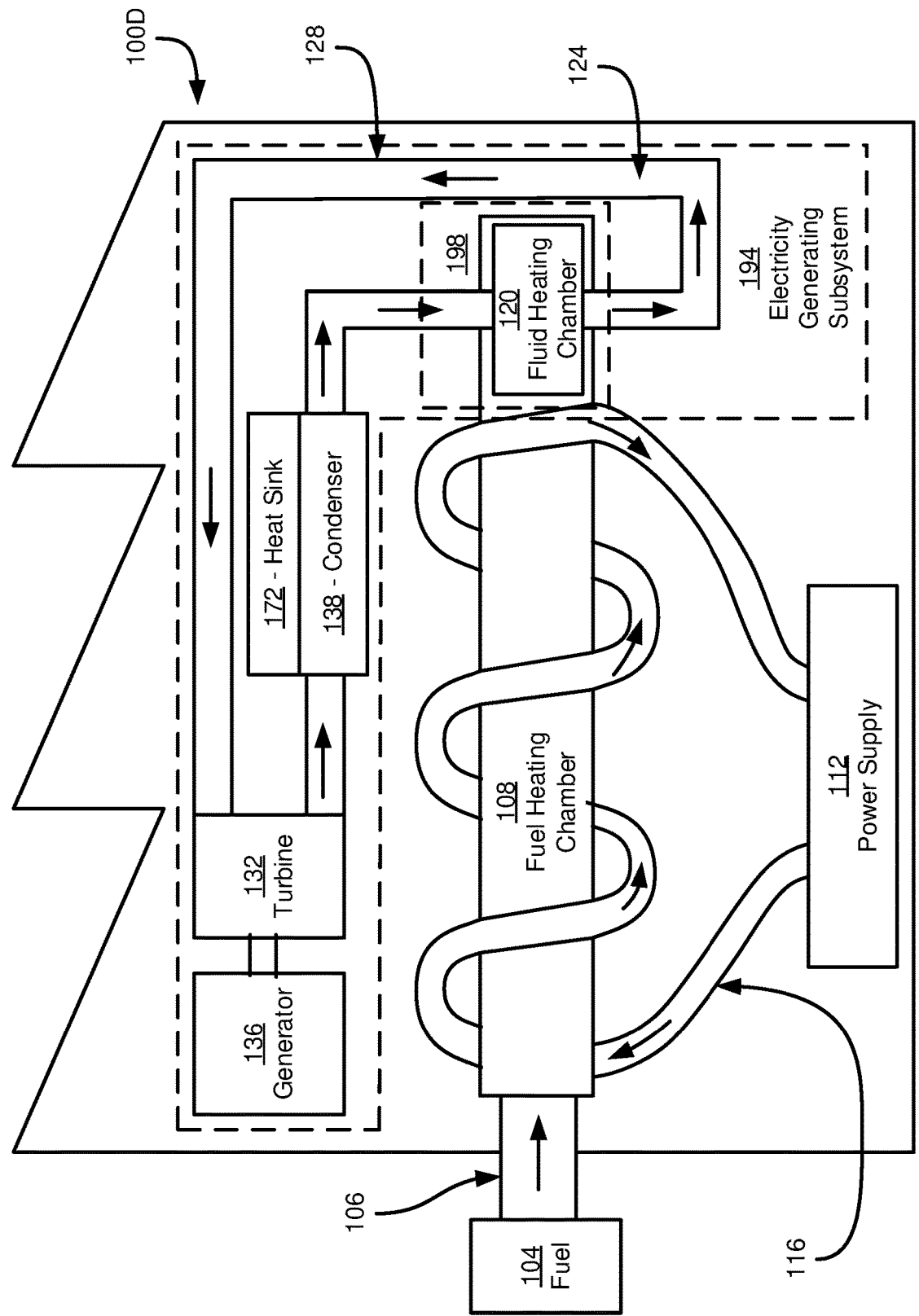
FIG. 10 shows a diagram of another example thermal power plant to be used in space.

In an alternative example, FIG. 10 depicts example thermal power plant 100D which can be used in space. In thermal power plant 100D, heat sink 172 is in thermal contact with condenser 138. Heat sink 172 is also exposed to the vacuum of space. This allows for working fluid 124 to be condensed in condenser 138 exchange heat with heatsink 172.

Figure 11:
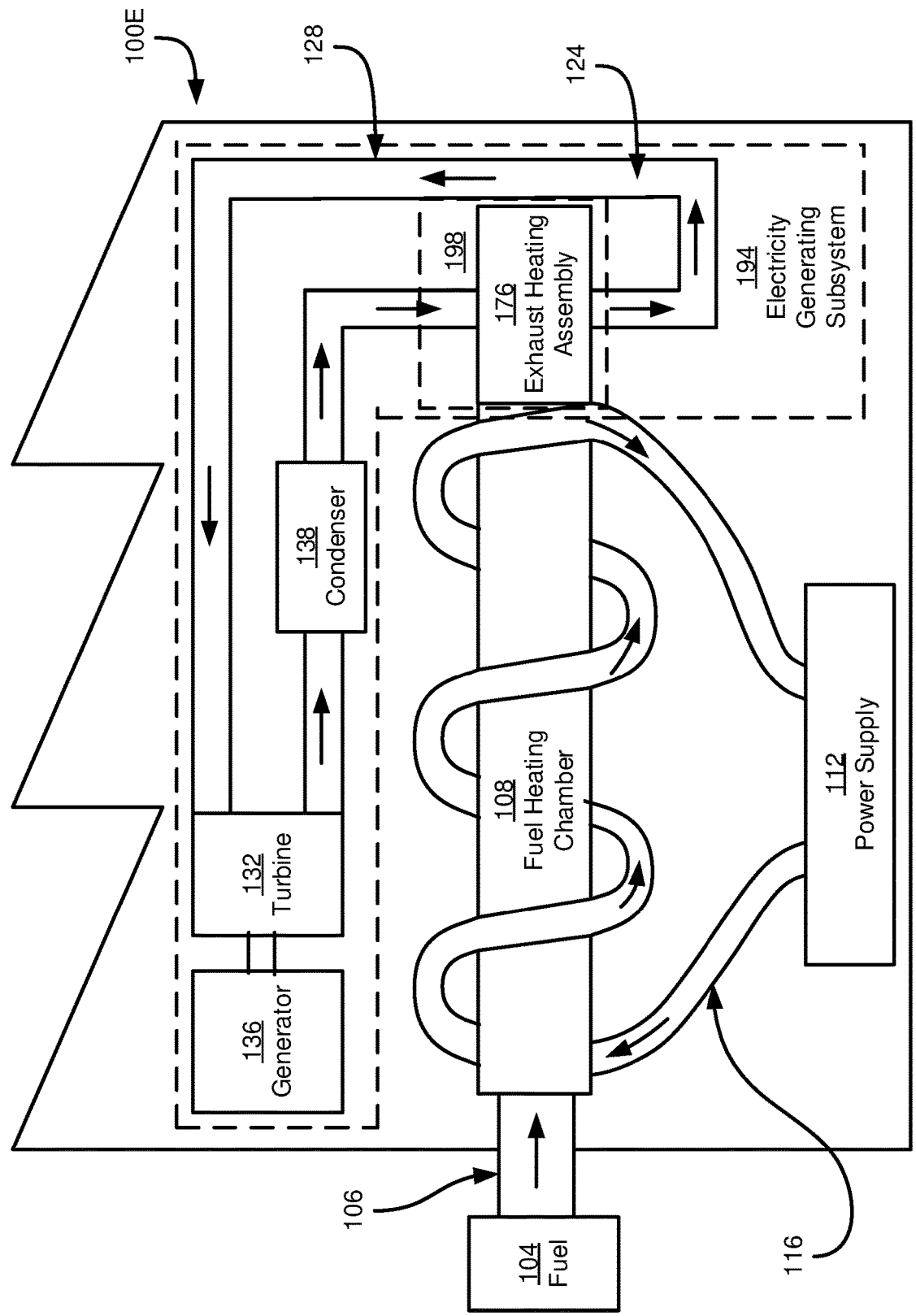
FIG. 11 shows a diagram of another example thermal power plant that includes an exhaust heating assembly.

In an alternative example, FIG. 11 depicts example thermal power plant 100E, where exhaust heating assembly 176 may be used to replace fluid heating chamber 120. In the previously mentioned embodiments, heat exchanger 198 was comprised of fluid heating chamber 120. In this example thermal power plant 100E, heat exchanger 198 is comprised of exhaust heating assembly 176. Exhaust heating assembly 176 includes an exhaust nozzle, and a chamber upon which working fluid 124 is present. In this embodiment, when fuel 104 is heated in fuel heating chamber 108, exhaust may be a byproduct of the heating. Exhaust (also known as flue gas) may be produced whether fuel 104 is heated to combustion, through sintering, or a combination of the two. The produced exhaust is hot, and the exhaust heat may be used to heat working fluid 124 through heat exchange. In the current embodiment, the chamber upon which working fluid 124 is present in exhaust heating assembly 176 may be isolated from the exhaust to prevent contamination of remnants from fuel 104 into working fluid 124. Heat exchange is possible through conductive elements of the chamber housing working fluid 124.

In another embodiment (not depicted), where exhaust heating assembly 176 may be used, heat exchanger 198 further includes two stages of exposure to exhaust heating assembly 176 for working fluid 124 that is received from flow line 128, the two stages being an evaporator and a superheater. Similar to an exhaust heating assembly 176, working fluid 124 is kept separate from the exhaust through an impermeable wall, and working fluid 124 may be in various distinct pipes in exhaust heating assembly 176 to increase the surface area of the impermeable pipe walls in contact with the exhaust. The two stages of exposure to exhaust for the pipes containing working fluid 124 may be placed in different regions of exhaust heating assembly 176, the superheater closer to the receiving point of exhaust from fuel heating chamber 108, and the evaporator further away from the receiving point of exhaust from heating chamber 108, where the receiving point of exhaust from fuel heating chamber 108 is hotter, and where the temperature decreases further away from the receiving point of exhaust. By having an evaporator and a superheater, working fluid 124 may be heated in two stages, allowing the temperature in working fluid 124 to rise quicker than an exhaust heating assembly 176 with only a single stage.

Figure 12:
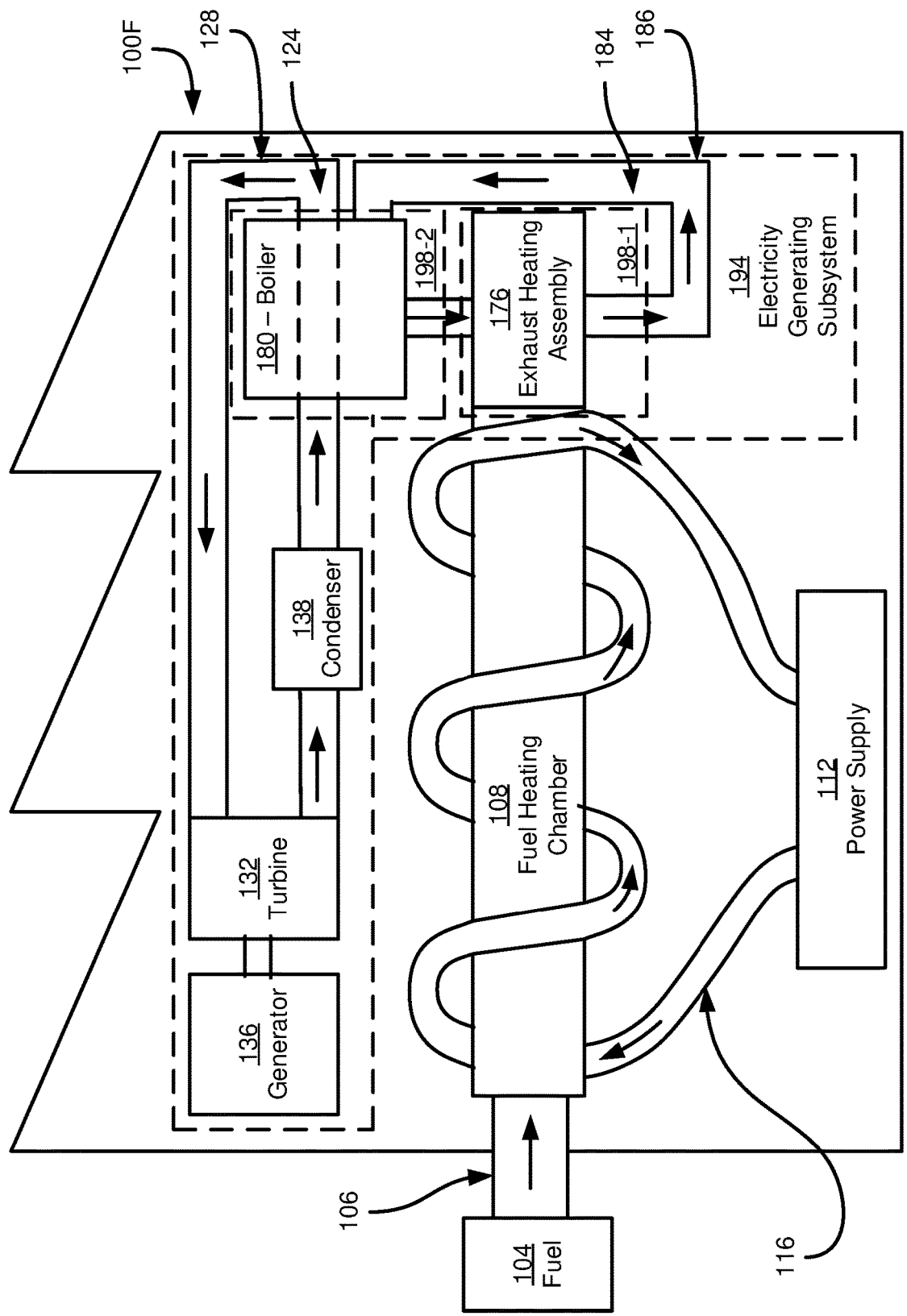
FIG. 12 shows a diagram of another example thermal power plant that includes an exhaust heating assembly and the use of two separate working fluids.

In an alternative example, FIG. 12 depicts example thermal power plant 100F, where two heat exchangers 198 may be used, heat exchange 198-1 and heat exchanger 198-2. In heat exchanger 198-1, exhaust heating assembly 176 is used to heat a secondary working fluid 184, which is circulated through secondary flow line 186. Flow line 128 and secondary flow line 186 are isolated from each other, and can hence carry different fluids for working fluid 124 and secondary working fluid 184. In the current example, working fluid 124 may be water, while secondary working fluid 184 may be sodium. Other working fluids 124 and secondary working fluids 184 may be contemplated.

Secondary working fluid 184 may be kept in a heated state by passing through exhaust heating assembly 176, where the exhaust from fuel heating chamber 108 heats secondary working fluid 184. Secondary working fluid 184 flows from exhaust heating assembly 176 to heat exchanger 198-2 through secondary flow line 186. Heat exchanger 198-2 includes boiler 180. The heated secondary working fluid 184 heats working fluid 124, as it flows through boiler 180. As stated above, working fluid 124 is kept isolated from secondary working fluid 184. A impermeable wall in boiler 180 separates working fluid 124 and secondary working fluid 184. This is to prevent contamination of working fluid 124 as it goes around to power turbine 132. In the current example, working fluid 124 is conductively heated through the impermeable wall in flow line 128 when it runs through boiler 180. While depicted linearly in FIG. 12, other embodiments could involve flow line 128 in a coil shape to provide additional surface area upon which heat from secondary flow line 186 can be conductively exchanged.

In an alternative example (not depicted), the thermal power plant has means of cogenerating electricity and heat simultaneously. Heat that is expelled from turbine 132 can be collected using a heat recovery unit. The heat can then be used for multiple purposes. An example use for the collected heat is to provide houses with hot water. By using cogeneration, wasted thermal energy is put to some productive use. Similarly, trigeneration and multigeneration of electricity and heat is contemplated.

In an alternative example (not depicted), the thermal power plant is used for multi-generation to simultaneously generate electricity, useful heat, cooling, propulsion, energy storage, and industrial products.

In an alternative example, (not depicted), the thermal power plant is configured with nano-thermite fuel dispersed in a solid medium and shaped as rods. The nano-thermite fuel rods are surrounded by multiple coils. The coils are powered by a power supply, which create a magnetic field around the nano-thermite fuel shaped rods, heating them. By controlling the magnetic field, the nano-thermite fuel shaped rods can be kept at a high temperature-without any phase change. This allows for working fluids that surround the rods to be heated, and hence power turbines and generators.

In an alternative example (not depicted), the thermal power plant is configured with replaceable nano-thermite fuel rods. Similar to the example above, nano-thermite fuel rods are surrounded by multiple coils, and the coils are powered by a power supply, which create a magnetic field around the nano-thermite fuel shaped rods, heating them. In this example, the nano-thermite fuel shaped rods are combusted. Once combusted, they may be replaced with new nano-thermite fuel rods. The combustion of the nano-thermite fuel rods heats working fluids surrounding the rods, which then may power turbines and generators.

In an alternative example, (not depicted), the thermal power plant is configured with rods that are covered in nano-thermite fuel. The rods covered in nano-thermite fuel are surrounded by multiple coils similar to the above examples. Similar to the above example, the coils are powered by a power supply, which create a magnetic field around the rods covered in nano-thermite fuel, heating them. By controlling the magnetic field, the rods can be kept at a high temperature and there is a controlled timed combustion of the nano-thermite fuel covering the rods. This allows for working fluids that surround the rods to be heated, and hence power turbines and generators.

It may be contemplated that the use of recycler 148 in example thermal plants 100A and 100B may be used in different embodiments of thermal power plants 100C, 100D, 100E and 100F. As indicated above, recycler 148 may be used to convert combustion byproduct 144 into useful end products. Example end products include materials for manufactured products or consumer goods. One of the advantages of using recycler 148, is that there is less waste, and combustion byproduct 144, which may be harmful to the environment may be converted into a cleaner alternative. A further advantage of thermal power plant 100C, where recycler 148 is connected to supplying fuel 104 for fuel heating chamber 108, is that there is significantly less waste, as the end product is re-used again.

In other implementations, the thermal power plants can be combined with renewable and non-renewable power generation systems for generation and/or multi-generation of generated electricity, useful heat, cooling, propulsion, energy storage, and industrial products. Non-renewable power generation systems include but not limited to oil, gas, coal, natural gas, and nuclear power or the like. Renewable power generation systems include but not limited to solar thermal, biomass, compressor, fuel cell, and geothermal or the like.

In other implementations, multi-generation is achieved through spin-mediated interconversion phenomena between dissimilar physical entities to create electricity, light, sound, vibration and heat—for Earth and in Space based systems. These phenomena include but not limited to the Seeback effect, Peltier effect, Spin Seebeck effect, Spin Peltier effect, Spin Hall effect and Inverse spin Hall effect. Spin conversions take place in regions near the interface between physical entities that are mediated by spins, which transfer angular momentum allowing for interconversion of electricity, light, sound, vibration and heat.

Excess energy is stored in Energy Storage Systems for on-demand applications and distribution. These systems include but are not limited to electrochemical, electromagnetic, thermodynamic, and mechanical. Stored energy is used either directly or indirectly through energy conversion processes as needed to provide a balance between energy supply and demand. Distribution networks may combine a plurality of transmission methods to connect a plurality of nodes to optimize for sustainable delivery and utilization.

Thermal power plants that heat nano-thermite fuels through induction pollute less. Further to this, as contemplated in this present invention, recycler 148 may be used to further minimize pollution, by further converting any combustion byproducts 144 into useful end products that may be used in a variety of uses, spanning from consumer goods, to raw materials to be used in construction. Pollution and waste can be further reduced by having recycler 148 convert combustion byproducts 144 into fuel that can be then fed back into the thermal power plant. Recycler 148 may be used in conjunction with different embodiments of thermal power plants comprising nano-thermite fuels that are heated through induction. Further advantages to heating nano-thermite fuels through induction in thermal power plants include the operation of the thermal power plant in space and in extreme environments.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A thermal power plant to generate electricity, the thermal power plant comprising:
   a fuel heating chamber configured to receive a nano-thermite fuel;
   an induction heating assembly configured to heat the nano-thermite fuel in the fuel heating chamber via induction heating; and
   an electricity generating subsystem comprising:
      a heat exchanger including a fluid heating chamber in thermal communication with the fuel heating chamber and configured to receive a working fluid, the heat exchanger to transfer heat from the heated nano-thermite fuel to the working fluid in the fluid heating chamber; and
      a flow line coupled to the heat exchanger and configured to receive the heated working fluid from the fluid heating chamber and circulate the heated working fluid to propel a turbine and generate electricity via a generator.

2. The thermal power plant of claim 1, wherein the heat exchanger comprises:
   an impermeable wall between the fluid heating chamber and the fuel heating chamber, wherein the working fluid is configured to be heated via conduction heating through the impermeable wall by the heated nano-thermite fuel.

3. The thermal power plant of claim 1, wherein the induction heating assembly comprises an electromagnet, and an electronic oscillator that passes alternating current through the electromagnet.

4. The thermal power plant of claim 1, further comprising a mixing chamber configured to mix the nano-thermite fuel and the working fluid to form a slurry, the mixing chamber coupled to the heat exchanger, wherein the fuel heating chamber and the fluid heating chamber form an integrated heating chamber configured to heat the slurry.

5. The thermal power plant of claim 1, wherein the induction heating assembly is configured to sinter the nano-thermite fuel in the fuel heating chamber.

6. The thermal power plant of claim 1, wherein the induction heating assembly is configured to heat the nano-thermite fuel to combustion, and wherein the thermal power plant further comprises a collection line connected to the fuel heating chamber to collect a combustion byproduct from the combustion of the nano-thermite fuel.

7. The thermal power plant of claim 6, further comprising a recycler configured to receive at least one combustion byproduct from the collection line and alter chemical composition of the combustion byproduct into a recycled product.

8. A method of generating electricity using a thermal power plant, the method comprising:
receiving a nano-thermite fuel by a fuel heating chamber;
heating the nano-thermite fuel in the fuel heating chamber using induction heating; and
converting heat from the heated nano-thermite fuel into electricity via an electricity generating subsystem, the electricity generating subsystem comprising:
a heat exchanger including a fluid heating chamber in thermal communication with the fuel heating chamber and configured to receive a working fluid, the heat exchanger to transfer heat from the heated nano-thermite fuel to the working fluid in the fluid heating chamber; and
a flow line coupled to the heat exchanger and configured to receive the heated working fluid from the fluid heating chamber and circulate the heated working fluid to propel a turbine and generate electricity via a generator.

9. The method of claim 8, wherein heating the nano-thermite fuel comprises: passing an alternating current through an electromagnet via an electronic oscillator, and placing the nano-thermite fuel inside a surrounding electromagnet.

10. The method of claim 8, further comprising mixing the nano-thermite fuel with the working fluid in a mixing chamber to create a slurry; and delivering the slurry to the heat exchanger for heating, wherein the fluid heating chamber and the fuel heating chamber form an integrated heating chamber of the heat exchanger.

11. The method of claim 10, further comprising separating the heated working fluid and the heated nano-thermite fuel; collecting the heated nano-thermite fuel in a collection line; and circulating the heated working fluid through the flow line.

12. The method of claim 11, further comprising: condensing the nano-thermite fuel; and returning the condensed nano-thermite fuel to the mixing chamber to be mixed with the working fluid.

13. The method of claim 12, further comprising: condensing the working fluid after circulation; and returning the condensed working fluid to the mixing chamber to be mixed with the nano-thermite fuel.

14. The method of claim 8, wherein heating the fuel comprises combusting the nano-thermite fuel and creating at least one combustion byproduct.

15. The method of claim 14, further comprising: collecting at least one combustion byproduct from the fuel heating chamber using a collection line; and transporting the combustion byproduct via the collection line to a recycler.

16. The method of claim 15, further comprising altering chemical composition of the combustion byproduct into a recycled product in the recycler.

17. The method of claim 8, wherein heating the fuel comprises sintering the nano-thermite fuel in the fuel heating chamber.

18. The thermal power plant of claim 1, further comprising a heat recovery nit configured to recover heat from the electricity generating subsystem to cogenerate heat and electricity.

19. The thermal power plant of claim 1, further comprising an energy storage system coupled to the electricity generating subsystem, the energy storage system configured to store energy generated by the thermal power plant, the energy storage system further configured to provide energy to the induction heating assembly.

20. The thermal power plant of claim 1, further comprising a distribution network coupled to the electricity generating subsystem, the distribution network configured to receive electricity from the electricity generating subsystem and further configured to deliver power, useful heat, and cooling.

21. The method of claim 8, further comprising mixing the nano-thermite fuel with in-situ space resources for long-term operations in space.

22. The thermal power plant of claim 1, wherein the heat exchanger comprises: an exhaust heating assembly coupled to the fuel heating chamber, the exhaust heating assembly configured to receive the working fluid, the working fluid to be heated via exhaust from the fuel heating chamber through an impermeable wall, and the working fluid separated from the exhaust with the impermeable wall.

23. The method of claim 8, wherein the heat exchanger comprises: an exhaust heating assembly coupled to the fuel heating chamber, the exhaust heating assembly configured to receive the working fluid, the working fluid to be heated via exhaust from the fuel heating chamber through an impermeable wall, and the working fluid separated from the exhaust with the impermeable wall.

24. The thermal power plant of claim 1, wherein the nano-thermite fuel is dispersed into the fuel heating chamber in a controlled fashion.

25. The method of claim 8, wherein receiving the nano-thermite fuel into fuel heating chamber further comprises dispersing the nano-thermite fuel into fuel heating chamber.

* * * * *